US007768755B1

(12) United States Patent
Xiong et al.

(10) Patent No.: US 7,768,755 B1
(45) Date of Patent: Aug. 3, 2010

(54) OVER-VOLTAGE PROTECTION AND AUTOMATIC RE-STRIKE CIRCUIT FOR AN ELECTRONIC BALLAST

(75) Inventors: Wei Xiong, Madison, AL (US); Danny Pugh, Harvest, AL (US); Christopher Radzinski, Huntsville, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 412 days.

(21) Appl. No.: 11/949,938

(22) Filed: Dec. 4, 2007

(51) Int. Cl.
*H02H 3/20* (2006.01)

(52) U.S. Cl. .......................... 361/91.1; 361/18; 361/72; 315/119

(58) Field of Classification Search .................. 361/18, 361/71–75, 91.1; 315/119
See application file for complete search history.

(56) References Cited

U.S. PATENT DOCUMENTS

| | | | | |
|---|---|---|---|---|
| 4,241,372 | A * | 12/1980 | Sears | 361/72 |
| 4,914,355 | A * | 4/1990 | Mertens et al. | 315/307 |
| 5,818,669 | A * | 10/1998 | Mader | 361/18 |
| 5,883,473 | A | 3/1999 | Li et al. | |
| 6,043,612 | A | 3/2000 | Knobloch et al. | |
| 6,194,842 | B1 * | 2/2001 | Canova | 315/225 |
| 6,274,987 | B1 * | 8/2001 | Burke | 315/307 |
| 6,359,396 | B1 | 3/2002 | Wicklund et al. | |
| 6,392,365 | B1 * | 5/2002 | Zhou et al. | 315/291 |
| 6,420,838 | B1 | 7/2002 | Shackle | |
| 6,734,637 | B2 | 5/2004 | Ellams | |
| 6,819,063 | B2 * | 11/2004 | Nemirow | 315/308 |
| 7,015,652 | B2 * | 3/2006 | Shi | 315/224 |
| 7,019,468 | B2 | 3/2006 | Deurloo et al. | |
| 7,098,607 | B2 | 8/2006 | Yu et al. | |
| 7,098,608 | B2 | 8/2006 | Yu et al. | |
| 7,111,944 | B2 * | 9/2006 | Morishita | 353/85 |
| 7,132,803 | B2 | 11/2006 | Shackle et al. | |
| 7,154,232 | B2 | 12/2006 | Contenti et al. | |
| 7,365,951 | B2 * | 4/2008 | Sun et al. | 361/72 |
| 7,432,660 | B2 * | 10/2008 | Blair et al. | 315/209 CD |
| 7,564,195 | B2 * | 7/2009 | Zeng | 315/291 |
| 7,576,528 | B2 * | 8/2009 | Wang et al. | 323/284 |
| 2002/0047638 | A1 * | 4/2002 | Allison et al. | 315/307 |
| 2007/0164684 | A1 * | 7/2007 | Blair et al. | 315/209 M |

* cited by examiner

*Primary Examiner*—Jared J Fureman
*Assistant Examiner*—Christopher J Clark
(74) *Attorney, Agent, or Firm*—Waddey & Patterson; Mark J. Patterson

(57) ABSTRACT

The present invention is an overvoltage protection and automatic re-strike circuit for an electronic ballast. The electronic ballast has an inverter, a shut-down circuit, a safety circuit, a monitoring circuit, and an overvoltage protection circuit. The inverter provides an appropriate alternating current power supply to operate the lamp. The shut-down, safety, monitoring, and overvoltage protection circuits are coupled to the inverter and provide the overvoltage protection and automatic re-striking functions. During an overvoltage condition, the overvoltage protection circuit will temporarily disable the inverter. Subsequent to the overvoltage condition, the overvoltage protection circuit permits the inverter to attempt to re-ignite the lamp. After a predetermined number of unsuccessful re-ignition attempts, the safety circuit will permanently disable the inverter to avoid damage to the ballast.

20 Claims, 3 Drawing Sheets

OVER-VOLTAGE PROTECTION AND AUTOMATIC RE-STRIKE CIRCUIT FOR AN ELECTRONIC BALLAST

BACKGROUND OF THE INVENTION

The present invention relates generally to electronic ballasts used for powering gas discharge lamps. More particularly, the present invention pertains to methods and circuits for providing overvoltage protection and automatic lamp re-striking in an electronic ballast.

Electronic ballasts for gas discharge lamps, e.g. fluorescent lights, are well known in the prior art. Electronic ballasts can provide, among others, the means to ignite and operate the gas discharge lamps.

Gas discharge lamps are lit through a variety of methods. For exemplary purposes, one method requires the lamp, having an elongated tube with a phosphor coating on the inside surface, to be subjected to a large voltage differential between its terminals. This large voltage differential is sufficient to generate an electrical pathway between the terminals (the voltage differential is greater than the breakdown voltage between the lamp terminals). The resultant current flowing between the terminals excites gaseous atoms, already present in the tube of the lamp, which in turn causes the gaseous atoms to release photons. These photons are outside of the visible spectrum, typically, in the ultraviolet range. These ultraviolet photons bombard the atoms comprising the phosphor coating of the tube and cause the phosphor coating to release photons which are in the visible spectrum. In this way visible light is produced.

The ballast occupies an integral role in this process. The ballast supplies the means to ignite the lamp through the process detailed above. Once the lamp is ignited, the ballast also regulates the electrical current that flows through the lamp. Without the regulation efforts of the ballast, the current demanded by the lamp would be significant because once the lamp begins to operate it presents very little electrical resistance. If there was not a mechanism to curtail the current demanded by the lamp, the lamp would be impractical to use.

Of particular import is the ability of the ballast to reliably ignite, or re-ignite, the lamp after the lamp malfunctions or is replaced. Ideally, the ballast should successfully ignite the lamp with only one attempt but it is not unusual for a ballast to make a series of ignition attempts before the lamp actually ignites. This succession of ignition pulses engenders the ballast ignition system with a degree of robustness.

However, it is also desirable for the ballast to recognize when a lamp is faulty and cannot be lit or when no lamp is present. In either case it would be advantageous for the ballast to appreciate that further ignition attempts will be fruitless. Unfettered re-ignition attempts can pose safety risks to those exposed to the lamp fixture because the ballast must generate a significant voltage to induce the lamp to ignite. Moreover, continuous ignition or re-ignition attempts needlessly stress the ballast and can lead to premature component fatigue and eventual failure. Consequently, a ballast that can generate a series of ignition pulses to effectively ignite a lamp and can also diagnose when further ignition attempts are ill advised is desirable.

No less crucial than ignition concerns is a the ability of the ballast to guard against potentially damaging overvoltage conditions, such as when the lamp experiences input arcing or unsuccessful ignition attempts. To effectively forestall damage from overvoltage conditions, the ballast must expeditiously recognize and suppress the overvoltage condition before irreparable damage occurs. As with unnecessary ignition attempts, overvoltage conditions are deleterious to the ballast because the ballast's components are stressed. Prolonged and/or excessive overvoltage conditions can stress the components until they fail.

As discussed above, when a ballast attempts to ignite a lamp, a large voltage differential is presented across the lamp terminals. Typically, this voltage differential is applied across the terminals by an inverter. For a myriad of reasons a lamp may not ignite even with a sufficient voltage differential across its terminals—alternatively, ignition may not even be possible if no lamp is present. If the differential were allowed to build beyond this point the ballast may be damaged, in addition to posing dangers for individuals working around these ballasts. To prevent this from happening the ballast needs an overvoltage protection mechanism to disable the inverter or otherwise safely dissipate the accumulated voltage differential. Additionally, to effectively protect the ballast, the overvoltage protection mechanism must rapidly address this overvoltage condition.

Thus, a contentious relationship exists between providing a voltage differential large enough to effectively ignite the lamp, overstressing the ballast by exposing the ballast to extreme voltages or high voltages for prolonged periods of time, and mitigating potential hazards to persons dealing with the ballast. As such, a ballast capable of expertly managing these concerns, particularly any associated overvoltage conditions that may arise, is paramount to safe and reliable ballast operation.

The prior art has not left these concerns unaddressed. Conventional ballasts disclosed in the prior art handle overvoltage conditions by completely disabling the inverter or retarding the output of the inverter. Prior art ballasts also teach systems having multiple re-strike ignition capabilities that can be limited to a predetermined number of attempts. For example U.S. Pat. No. 7,015,652 issued to Shi discloses one such ballast. Shi teaches a ballast having an overvoltage protection system with multiple re-strike capabilities that can be controlled. However, the prior art does not include a ballast that has a reliable, safe, automatic re-striking capability following an overvoltage shutdown condition, an overvoltage protection mechanism that responds with sufficient speed to protect the ballast regardless of the cause of the overvoltage condition, and the ability to recognize when further re-ignition attempts should cease, e.g. a faulty lamp.

What is needed, then, is a ballast that provides overvoltage protection and re-ignition systems that cooperate to produce an effective, reliable ballast in a simple implementation so that measured automatic re-ignition attempts are made after the ballast has reacted to an overvoltage condition.

BRIEF SUMMARY OF THE INVENTION

The present invention is an electronic ballast for a gas discharge lamp having an overvoltage protection system and an automatic re-striking function. The electronic ballast has an inverter, a shut-down circuit, a safety circuit, a monitoring circuit, and an overvoltage protection circuit. The inverter provides an appropriate alternating current power supply to operate the lamp. The shut-down, safety, monitoring, and overvoltage protection circuits are coupled to the inverter and provide the overvoltage protection and automatic re-striking functions.

The overvoltage protection circuit is able to detect an overvoltage condition in the inverter. In one embodiment, this detection is accomplished by a sensor magnetically coupled to a resonant circuit of the inverter. The overvoltage may be the result of a ballast or lamp failure condition. If an overvoltage condition is detected, the overvoltage protection circuit will temporarily disable both the inverter and the monitoring circuit via the shut-down circuit, which is operably connected to the power supply for the inverter. This temporary disablement allows the overvoltage condition to dissipate. When the overvoltage condition is no longer present the overvoltage protection circuit will permit the inverter to institute re-ignition efforts.

The safety circuit operates to permanently disable the inverter when a safety threshold has been exceeded. The safety threshold is exceeded if the inverter experiences more than a predetermined number of overvoltage events or conditions. This threshold can be adjusted by the selection of ballast circuit components. The threshold corresponds to a state indicating that the ballast has failed, the lamp has failed, or no lamp is present. Thus, when an overvoltage condition is present, or immediately thereafter, and the safety threshold is exceeded, the safety circuit, via the shut-down circuit, will prevent the inverter from attempting to re-ignite the lamp. Subsequent to this scenario, the ballast will function only after the lamp has been replaced or the power to the ballast has been recycled. Accordingly, the final state of the inverter, i.e. its ability to attempt re-ignition, hinges on whether, during the overvoltage event, the safety threshold was exceeded.

To ensure that the safety circuit does not prematurely or inadvertently disable the inverter, the monitoring circuit prevents the safety circuit from functioning under normal inverter operating conditions. Thus, in order for the safety circuit to activate, the overvoltage protection circuit must first disable the monitoring circuit, as occurs during an overvoltage condition, and the safety threshold must be exceeded. The interaction between the safety, monitoring, shut-down, and overvoltage protection circuits engender the ballast with the ability to rapidly detect and correct overvoltage conditions, re-ignite the lamp after an overvoltage condition, and recognize that an anomaly exists with the ballast or lamp and cease re-ignition attempts.

For example, if a new lamp is inserted into the ballast and the lamp is not lit by the first attempt, the inverter may encounter an overvoltage condition. To prevent damage to the lamp or the ballast, the overvoltage protection circuit, via the shut-down circuit, will temporarily disable the inverter and the monitoring circuit until the overvoltage condition passes. After the overvoltage condition subsides the inverter will be free to attempt to ignite the lamp again, assuming the safety threshold was not exceeded. If a re-ignition attempt is successful and the inverter is within normal operating parameters, the monitoring circuit will obviate the safety circuit's ability to disable the inverter.

Now consider that the ballast contains a faulty lamp. In this scenario, the inverter will unsuccessfully attempt to light the lamp, which results in an overvoltage condition that that is corrected by the overvoltage protection circuit. During each overvoltage condition, the overvoltage protection circuit disables the monitoring circuit, in addition to the inverter, so that the safety circuit may evaluate the state of the ballast and/or lamp. After some number of unsuccessful attempts, and during or immediately after the overvoltage event, the safety threshold will be exceeded and the safety circuit will permanently disable the inverter. The inverter will be disabled, or locked-up, until either the power to the ballast is cycled or the lamp is removed.

Accordingly it is an object of the invention to provide an electronic ballast having an overvoltage protection circuit.

It is another object of the invention to provide an electronic ballast with an automatic re-striking capability.

It is yet another object of the invention to provide an electronic ballast with an overvoltage protection circuit that temporarily disables the inverter to correct overvoltage conditions and permanently disable the inverter after predetermined number or sequence of ignition attempts.

It is still another object of the invention to provide an electronic ballast that can rapidly respond to overvoltage conditions to avoid damage to the ballast.

It is also an object of the invention to provide an electronic ballast that can reliably re-start after an overvoltage condition has subsided.

DETAILED DESCRIPTION OF THE INVENTION

I. Functional Overview

Figure 3:
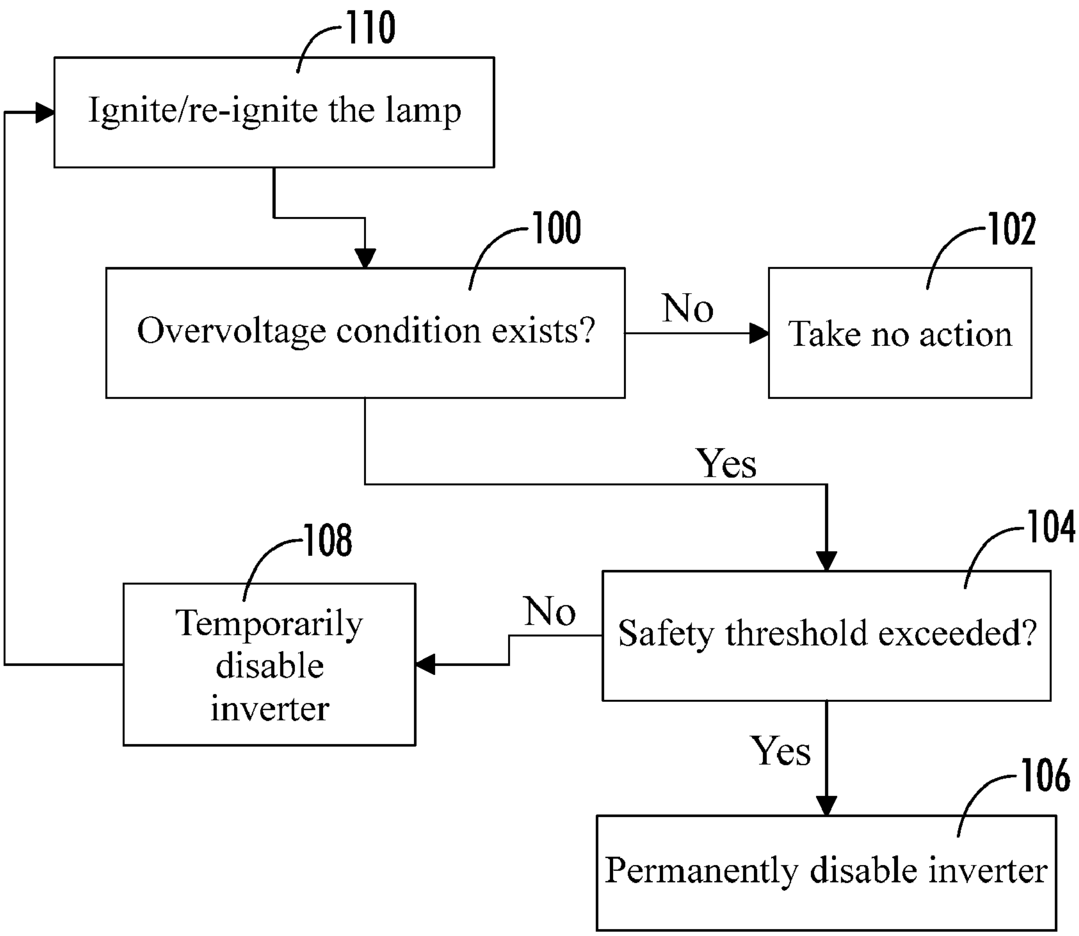
FIG. 3 is a flow chart describing a sequence of steps implemented by the method of the invention to address overvoltage conditions.

FIG. 3 illustrates a sequence of steps in which the method of the invention evaluates and corrects overvoltage conditions and provides automatic re-striking capabilities. Initially, it is determined if an overvoltage condition exists, as shown in step 100. If no overvoltage condition is detected then step 102 instructs that no action is taken. However, if an overvoltage condition is detected step 104 then determines if the safety threshold has been exceeded. If the safety threshold has been exceeded, indicating that an anomaly with the lamp or ballast exists, then the inverter is disabled, as depicted in step 106. Conversely, if the safety threshold has not been exceeded then step 108 proffers that the inverter be temporarily disabled so that the overvoltage condition may subside. Finally, after the overvoltage condition has dissipated, the inverter will automatically attempt to ignite or re-ignite the lamp, as described in step 110.

Figure 1:
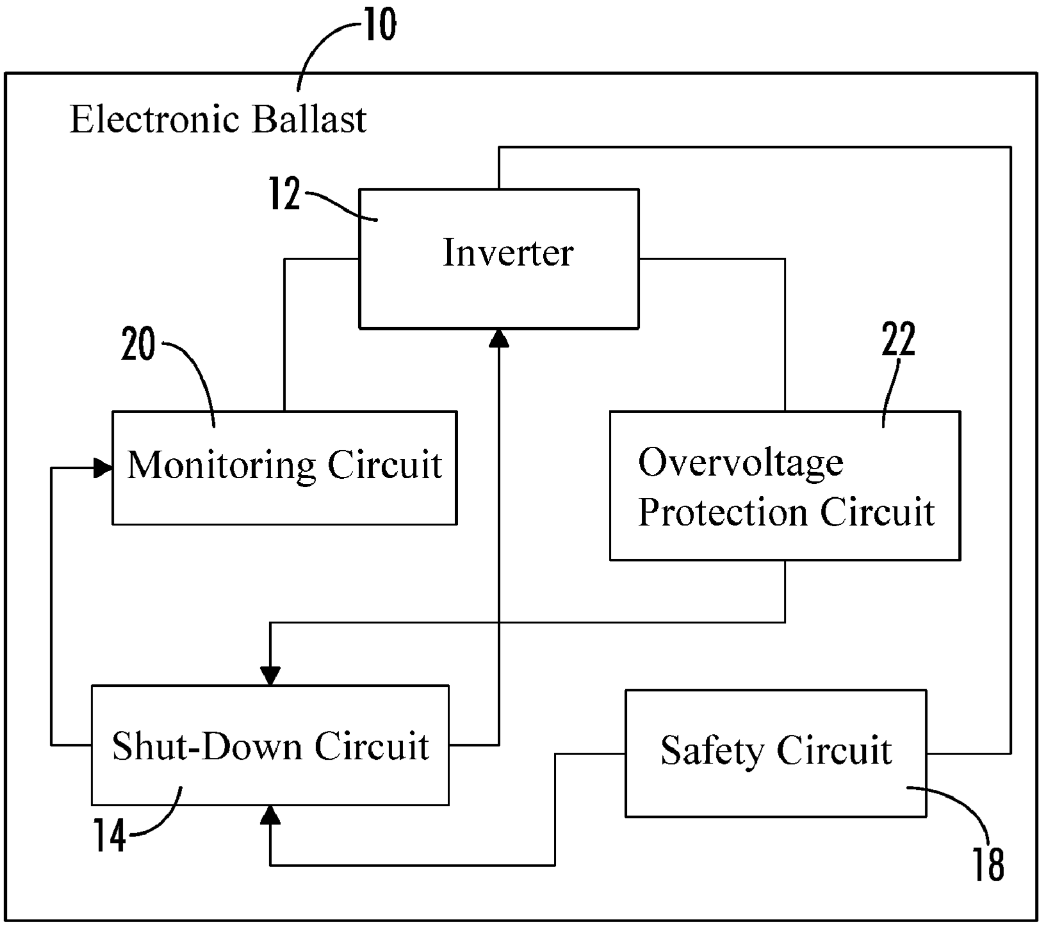
FIG. 1 is a block diagram of one embodiment of the present invention.
Figure 2:
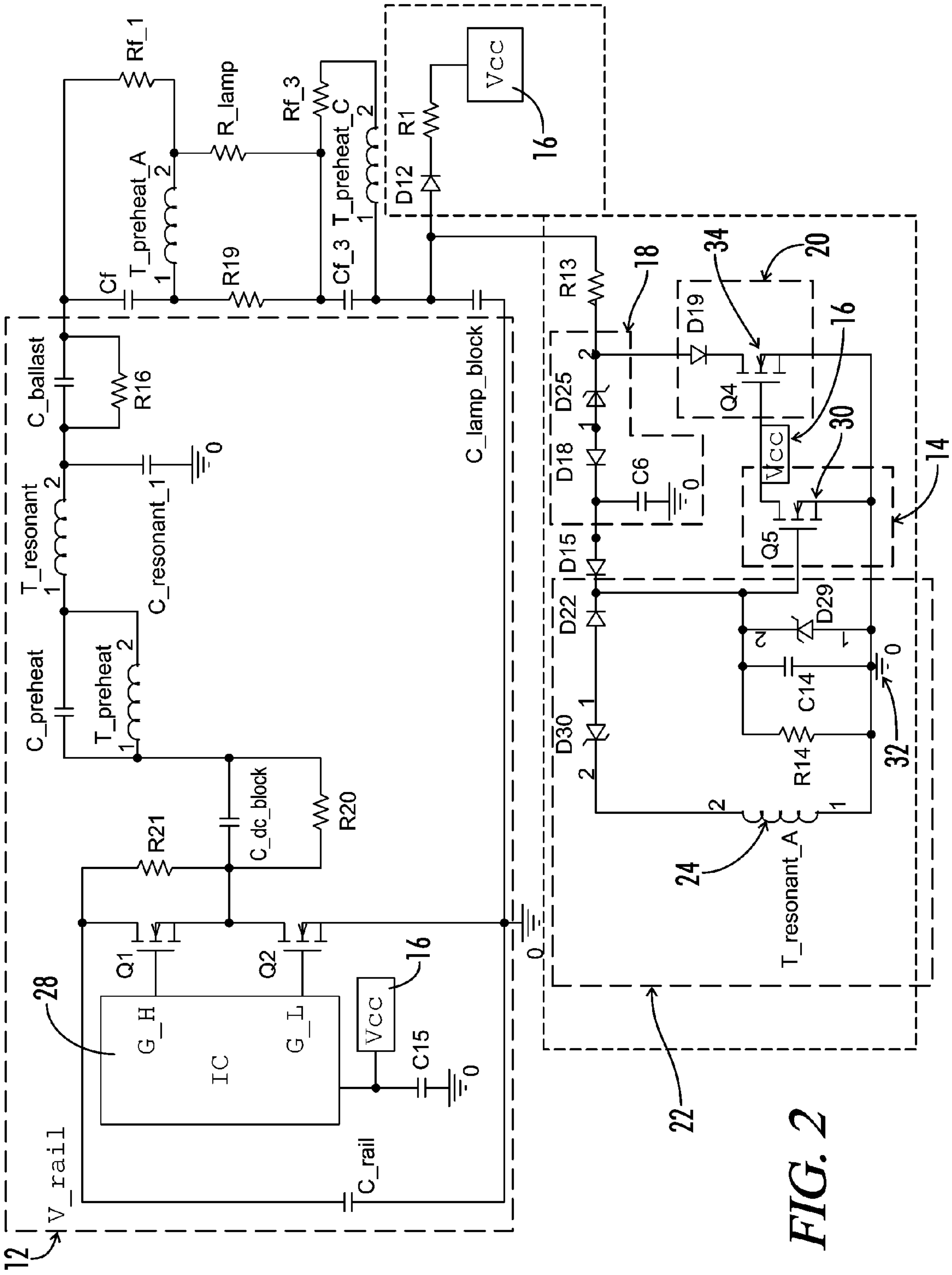
FIG. 2 is a schematic drawing of one embodiment of the invention shown in FIG. 1.

Now referring to FIGS. 1 and 2, the electronic ballast 10 for a gas discharge lamp has an inverter 12 that receives a rectified DC rail voltage and generates a relatively high frequency AC voltage suitable to operate a gas discharge lamp. The ballast 10 also includes a shut-down circuit 14 coupled to the inverter 12. Preferably, the shut-down circuit 14 is coupled to the power supply node 16 of the inverter 12 so that when the shut-down circuit 14 is activated, the shut-down circuit 14 will deny the inverter 12 sufficient power to operate—causing the inverter 12 to be disabled. It is also envisioned that the shut-down circuit 14 may be connected to an enabling node on the inverter 12, which must be set for proper operation, thereby permitting the shut-down circuit 14 to prevent the inverter 12 from continuing to supply power to the lamp.

It is further contemplated that the shut-down circuit 14 may indirectly control the operation of the inverter 12 by manipulating ballast circuit components that condition and supply the signals received by the inverter 12 or otherwise facilitate the operation of the inverter 12. For instance, a power factor correction circuit (not shown) may supply the inverter 12 with a conditioned signal and if the shut-down circuit 14 disables the power factor correction circuit the inverter 12 is also restricted from properly functioning. Regardless of the mechanism, the shut-down circuit 14 superintends the inverter 12.

The ballast 10 also includes a safety circuit 18 coupled to the inverter 12 and the shut-down circuit 14. The safety circuit 18 evaluates the state of the inverter 12 and functions to instruct the shut-down circuit 14 to disable the inverter 12 if a safety threshold is exceeded. Once the inverter 12 has been disabled at the direction of the safety circuit 18, the inverter can only be restarted if the ballast 10 is reset. This may occur if the power to the ballast 10 is cycled or a lamp is removed and replaced in the ballast 10.

The safety circuit 18 is designed to permanently disable (until the ballast power is cycled or a lamp is replaced) the inverter 12 when the safety threshold has been exceeded. The safety threshold may be exceeded if the ballast or lamp is faulty or if no lamp is connected to the ballast 10. As will be discussed in greater detail below, the inverter 12 will attempt to ignite, or re-ignite the lamp in any of the preceding conditions, i.e. faulty lamp, ballast, or no lamp. At some point it is desirable to prohibit any further attempts by the inverter 12 to re-strike (re-ignite) the lamp. The safety threshold serves to set this point. The safety threshold correlates to a predetermined number or cumulative duration of overvoltage conditions/events or a similar measure.

The desirability to restrict re-ignition attempts stems from the inexpedient results that may accompany limitless re-ignition efforts. These results include, among others, unnecessary stress on the ballast circuit components and shock hazards to individuals associating with the ballast. The crux of these undesirable effects is the significant voltage that must be developed by the inverter 12 to successfully ignite the lamp. The safety circuit 18 recognizes when additional ignition attempts are ill advised and stifles any such efforts by the inverter 12.

The monitoring circuit 20 is operably engaged to the inverter 12, the shut-down circuit 14, and the safety circuit 18. The monitoring circuit 20 prevents the safety circuit 18 from activating, and permanently disabling the inverter 12, during normal operating conditions (or normal inverter operating conditions). Normal operating conditions are those conditions in which the ballast 10 is functioning within acceptable parameters. More specifically, normal operating conditions are those other than overvoltage conditions/events and, potentially, immediately thereafter. An overvoltage condition may occur when the lamp or ballast malfunctions or no lamp is present and the inverter 12 generates a large voltage differential in an endeavor to re-strike or re-ignite the lamp. Thus, as long as the inverter 12, or the ballast 10 in general, is operating within acceptable limits, the monitoring circuit 20 will preclude the safety circuit 18 from activating.

The overvoltage protection circuit 22 is capable of detecting overvoltage conditions in the inverter 12 or ballast 10. Furthermore, once an overvoltage condition has been detected, the overvoltage protection circuit 22 will temporarily disable the inverter 12 via the shut-down circuit 14. By temporarily disabling the inverter 12, the overvoltage protection circuit 22 allows any unwanted overvoltage conditions to dissipate. Following the elimination of the overvoltage condition, the overvoltage protection circuit 22 will allow the inverter 12 to attempt re-ignition of the lamp or otherwise resume normal operation.

The overvoltage protection circuit 22 will also disable the monitoring circuit 20 during overvoltage conditions thereby allowing the safety circuit 18 to evaluate the state of the inverter 12 and ascertain if a permanent shut-down is in order, i.e. has the safety threshold been exceeded? If the threshold has been exceeded the safety circuit 18 will instruct the shut-down circuit 14 to disable the inverter 12. If the safety threshold was not exceeded and the overvoltage condition has ended, the overvoltage protection circuit 22 will permit the monitoring circuit 20 to reactivate which, in turn, disables the safety circuit 18 and allows the inverter 12 resume its operation.

In sum, the interaction between the shut-down circuit 14, the safety circuit 18, the monitoring circuit 20, and the overvoltage protection circuit 22 bestow the present invention with the ability to provide rapid overvoltage protection, automatic re-strike capabilities, and the faculties to recognize when to permanently disable the ballast because further re-strike attempts would be detrimental to the ballast or persons around the ballast.

Particularly, when the overvoltage protection circuit 22 detects an overvoltage it temporarily disables the monitoring circuit 20 and the inverter 12 through the shut-down circuit 14 until the condition has subsided. While the monitoring circuit 20 is disabled the safety circuit 18 is free to evaluate the state of the inverter/ballast and if the safety circuit 18 determines that the safety threshold has been exceeded, it will permanently disable the inverter 12 via the shut-down circuit 14. If the threshold has not been exceeded, the safety circuit will permit the inverter 12, and the monitoring circuit 20, to activate. Once activated, the monitoring circuit 20 will frustrate any efforts by the safety circuit 18 to disable the inverter 12 as long normal operating conditions persist. However, if the overvoltage protection circuit 22 detects another overvoltage, the above sequence repeats giving the safety circuit 18 another chance to determine if the safety threshold has been exceeded and disable the inverter 12.

II. Detailed Circuit Operation

The inverter 12 may have an inverter power supply node 16 (Vcc) with an operating supply potential, a potential sufficient to allow the inverter 12 to properly function. In one embodiment shown in FIG. 2, the inverter drive circuit (IC) 28 is powered by capacitor C15, which is charged through power supply node 16 (Vcc). Power supply node 16 is fed by V_rail through resistors R20, R21, R16, R19, R1, diode D12 and lamp filaments Rf_1 and Rf_3. When C15 is sufficiently charged, the inverter drive circuit 28 will generate inverter switching signals, allowing inverter 12 to commence normal operation.

The ballast 10 may also have a disabling node 32 with a potential lower than that of the operating supply potential. The disabling node potential does not meet the demands required to power the inverter 12. As shown in FIG. 2, the shut-down circuit 14 includes a switch 30, Q5, having a pair of terminals. One of the pair of terminals is coupled to the power supply node 16, and consequently C15, and the other of the pair of terminals is coupled to the disabling node 32, electrical ground in this embodiment.

Once the shut-down circuit 14 has been activated, by the monitoring circuit 20 or the safety circuit 18, the shut-down circuit 14, via switch 30, will rapidly discharge capacitor C15 through the disabling node 32 (essentially short circuiting C15 to ground). This will effectively disable the inverter 12 by deactivating the inverter drive circuit 28. As long as switch 30 is activated, i.e. the gate threshold voltage of Q5 is exceeded, C15 will not charge up and power the inverter drive circuit 28. Although the shut-down circuit 14 has been described through a transistor implementation, it would be obvious to one of ordinary skill in the art that a plethora of other implementations may serve to satisfy the same or similar ends.

The overvoltage protection circuit 22 may include a sensor 24 coupled to the inverter 12. The sensor 24 is capable of sensing overvoltage conditions in the inverter 12. In one embodiment shown in FIG. 2, the sensor 24 is a magnetically coupled secondary winding, T_resonant_A, of the inductor T_resonant. However, capacitive and resistive coupling are also within the scope of the invention as is the location of the coupling. T_resonant is coupled to the parallel resonant LC tank circuit (C_preheat and T_preheat). Any overvoltage conditions in the tank circuit will be reflected in the sensor 24. The overvoltage protection circuit 22 also includes Zener diodes D30 and D29, resistor R14, and capacitor C14 (protecting capacitor) depicted in FIG. 2.

As the voltage across T_resonant_A increases, such as from an overvoltage condition in the tank circuit, the voltage will cause D30 to break down and start conducting. Accordingly, D30 sets the overvoltage condition for the circuit. This will allow C14 to begin to charge through D30 and D22. Once the voltage across C14 reaches the turn-on threshold of switch 30, i.e. Q5, the switch 30 will conduct and discharge C15. As C15 is discharged, the inverter 12 will be disabled. As the inverter 12 is not contributing to the overvoltage condition, the condition will subside.

Eventually, D30 will stop conducting, because the biasing voltage relayed through T_resonant_A will fall in accordance with the dissipation of the overvoltage condition, and C14 will begin to discharge through R14. With C14 no longer supplying an adequate turn-on voltage for the switch 30, it will stop conducting and allow C15 to start charging. Once sufficiently charged, C15 will allow drive circuit 28 to start the inverter 12 and lamp ignition efforts will begin.

The actions of the overvoltage protection circuit 22 also impact the operation of the monitoring circuit 20. The monitoring circuit 20 includes a monitoring switch 34, also referred to as a second switch (Q4 in FIG. 2). Referring to FIG. 2, the gate of Q4, i.e. the control terminal, is coupled to C15 (and hence Vcc). Accordingly, during the response of the overvoltage protection circuit to an overvoltage condition, i.e. discharging C15, Q4 turns off. This occurs because as C15 is being discharged through Q5, the gate voltage on Q4 is pulled down below the gate threshold voltage thereby turning off Q4. As with the inverter 12, once the overvoltage condition is over, and C14 cannot bias Q5, C15 will charge up and eventually turn on Q4. Consequently, Q4 will be conducting during normal operating conditions.

The ballast 10 also includes a safety circuit 18 operably coupled to the monitoring circuit 20, the inverter 12, and the shut-down circuit 14. As shown in FIG. 2, the safety circuit may include a capacitor C6. One terminal of C6 is coupled to the gate of Q5 so that when C6 is sufficiently charged, it may activate Q5 so that C15 will discharge—disabling the inverter 12. The charge level at which the voltage across C6 is adequate to turn on transistor Q5 is referred to as the safety threshold or activation level. However, C6 is only permitted to charge when Q4 is turned off. When Q4 is conducting it will prevent C6 from charging because Q4 presents a less resistive path than that offered by path including C6. Thus, C6 will be prevented from turning on Q5 to disable the inverter 12 while Q4 is conducting. This prevents the safety circuit 18 from permanently disabling the inverter 12 during normal operating conditions.

As the overvoltage protection circuit 22 reacts to an overvoltage condition and turns Q4 off, C6 is allowed to charge through R13, D25, and D18. When the overvoltage condition has passed and C15 sufficiently charges to turn Q4 on, C6 will once again be precluded from further charging. As long as the safety threshold has not been exceeded, the inverter 12 will be able to attempt re-ignition of the lamp after the overvoltage condition has been corrected. However, after a predetermined sequence of overvoltage correction cycles C6 will incrementally charge to the extent that it is able to turn on Q5 and permanently disables the inverter 12. This sequence can be determined by careful selection of the ballast circuit components. The inverter 12 will be permanently disabled because once C6 is charged beyond the safety threshold, the inverter 12 will only reactivate if the power to the ballast 10 is cycled or the lamp is removed and replaced.

Thus, although there have been described particular embodiments of the present invention of a new and useful OVER-VOLTAGE PROTECTION AND AUTOMATIC RE-STRIKE CIRCUIT FOR AN ELECTRONIC BALLAST, it is not intended that such references be construed as limitations upon the scope of this invention except as set forth in the following claims.

What is claimed is:

1. An electronic ballast for a gas discharge lamp, comprising:
an inverter;
a shut-down circuit coupled to the inverter;
a safety circuit coupled to the inverter and to the shut-down circuit so that when a safety threshold is exceeded, the safety circuit is operable to instruct the shut-down circuit to disable the inverter until the ballast is reset;
a monitoring circuit operably coupled to the inverter, the safety circuit, and the shut-down circuit so that during normal inverter operating conditions the monitoring circuit is operable to prevent the safety circuit from disabling the inverter;
an overvoltage protection circuit coupled to the monitoring circuit, the inverter, and the shut-down circuit;
the overvoltage protection circuit is responsive to an overvoltage condition outside of the normal inverter operating conditions by causing the shut-down circuit to disable the inverter and the monitoring circuit until the overvoltage condition ends, and if the overvoltage condition cannot be corrected after a predetermined sequence, the safety circuit is operative to cause the shut-down circuit to disable the inverter until the ballast is reset; and
wherein the inverter is operable to attempt to re-strike the lamp following disablement of the inverter by the overvoltage protection circuit if the safety threshold has not been exceeded.

2. The ballast of claim 1 wherein the safety circuit comprises a capacitor having an associated charge level, and wherein when the charge level exceeds the safety threshold the safety circuit is operable to cause the shut-down circuit to disable the inverter.

3. The ballast of claim of 1 wherein the overvoltage protection circuit comprises a sensor and the inverter comprises a resonant circuit, and wherein the sensor is coupled to the resonant circuit so that the sensor can detect overvoltage conditions in the inverter.

4. The ballast of claim 1 further comprising:
a disabling node;
the inverter comprises an inverter power supply node having an operating supply potential;
the shut-down circuit comprises a first switch having first and second switch terminals;
the first switch terminal is coupled to the power supply node and second switch terminal is coupled to the disabling node; and
the disabling node has a potential lower than the supply node so that when the first switch is activated, the operating supply potential is pulled down to the disabling node potential and the inverter is disabled.

5. The ballast of claim 4 wherein the ballast includes an electrical ground and the safety circuit comprises a safety capacitor having a pair of terminals, with one of the safety capacitor terminals operably coupled to the electrical ground, and the first switch further comprises a control terminal coupled to the other of the safety capacitor terminals.

6. The ballast of claim 5 wherein the overvoltage protection circuit comprises a protecting capacitor having a first and second safety capacitor terminal, wherein the first safety capacitor terminal is operably connected to the control terminal and the second safety capacitor terminal is operably connected to the electrical ground.

7. The ballast of claim 6 wherein the monitoring circuit comprises a second switch having a monitoring terminal coupled to one of the safety capacitor terminals and to an enabling terminal coupled to the inverter power supply node.

8. An electronic ballast for a gas discharge lamp, comprising:

an inverter having a power supply node;

a shut-down circuit operatively coupled to the power supply node;

a safety circuit operably coupled to the inverter and to the shut-down circuit, wherein the safety circuit is responsive to overvoltage conditions in the inverter;

a monitoring circuit coupled to the inverter and to the safety circuit so that during normal operating conditions the monitoring circuit prevents the safety circuit from operating; and an overvoltage protection circuit operably connected to the inverter, the shut-down circuit, and the monitoring circuit;

the overvoltage protection circuit is functional to detect overvoltage conditions beyond the normal operating conditions and, during the overvoltage conditions, to cause the shut-down circuit to disable the inverter and the monitoring circuit; and if the overvoltage conditions are not corrected after a predetermined amount of time, the safety circuit is functional to instruct the shut-down circuit to disable the inverter until power to the ballast is cycled.

9. The ballast of claim 8 wherein:

the shut-down circuit comprises a shut-down switch having a first pair of terminals;

the monitoring circuit comprises a monitoring circuit switch having a second pair of terminals;

one of the first pair of terminals is coupled to one of the second pair of terminals, the other of the first pair of terminals is coupled to the safety circuit so that the safety circuit can activate the shut-down switch; and the other of the second pair of terminals is coupled to the safety circuit so that during normal operating conditions the monitoring circuit switch is functional to prevent the safety circuit from activating the shut-down switch.

10. The ballast of claim 9 wherein the safety circuit comprises a safety capacitor coupled to the other of the first pair of terminals.

11. The ballast of claim 10 wherein the safety capacitor is coupled to the power supply node of the inverter and has a charging time, and wherein when the charging time exceeds the predetermined amount of time, the safety capacitor will activate the shut-down switch, and further wherein until the safety capacitor activates the shut-down switch, the inverter will attempt to re-strike the lamp following the overvoltage condition.

12. The ballast of claim 9 wherein the ballast comprises a power supply for the inverter and the one of the first pair and the one of the second pair of terminals are coupled to the power supply.

13. The ballast of claim 9 wherein the overvoltage protection circuit comprises an overvoltage detector inductively coupled to the inverter so that the overvoltage detector can sense overvoltage conditions.

14. The ballast of claim 13 wherein the overvoltage protection circuit further comprises an overvoltage capacitor responsive to overvoltage conditions detected by the overvoltage detector and the overvoltage capacitor is coupled to the shut-down switch so that the overvoltage capacitor can activate the shut-down switch during overvoltage conditions.

15. An electronic ballast for a gas discharge lamp, the ballast having an inverter, comprising:

a safety circuit coupled to the inverter;

a monitoring circuit coupled to the safety circuit and to the inverter so that during normal inverter operating conditions the monitoring circuit prevents the safety circuit from activating;

an overvoltage protection circuit engaged to the inverter and functional to detect an overvoltage condition outside of the normal inverter operating conditions; and a shut-down circuit operably engaged to the safety circuit, to the monitoring circuit, to the overvoltage protection circuit, and to the inverter so that the shut-down circuit is responsive to the safety and overvoltage protection circuits and is functional to disable the inverter and the monitoring circuit;

wherein during the overvoltage condition, the overvoltage protection circuit is operative to cause the shut-down circuit to temporarily disable the inverter and the monitoring circuit and, if the overvoltage condition cannot be corrected after a predetermined sequence, the safety circuit is operative to cause the shut-down circuit to disable the inverter until the ballast is reset; and the inverter is operative to attempt to re-ignite the lamp after the overvoltage protection circuit temporarily disables the inverter unless the safety circuit causes the shut-down circuit to disable the inverter.

16. The ballast of claim 15 further comprising:

an electrical ground and a power supply for the inverter;

the shut-down circuit comprises a shut-down switch responsive to the overvoltage condition detected by the overvoltage protection circuit;

the shut-down switch is operably connected between the power supply and the electrical ground so that in response to the overvoltage condition the shut-down switch activates and disables the inverter.

17. The ballast of claim 16 wherein the safety circuit comprises a safety capacitor operably connected to the power supply and to the shut-down switch so that if the power supply charges the safety capacitor to an activation level, the safety capacitor will activate the shut-down switch to disable the inverter until the ballast is reset.

18. The ballast of claim 17 wherein the monitoring circuit comprises a monitoring switch operably connected to the power supply and to the safety capacitor such that the monitoring switch prevents the safety capacitor from charging unless the overvoltage protection circuit instructs the shut-down circuit to temporarily disable the monitoring circuit.

19. The ballast of claim 18 wherein the overvoltage protection circuit comprises a sensor operably connected to the inverter and the monitoring switch so that the sensor can detect the overvoltage condition in the inverter and in response deactivate the monitoring switch.

20. The ballast of claim 19 wherein the inverter comprises a parallel resonant circuit and the sensor is inductively coupled to the parallel resonant circuit.

* * * * *